(12) United States Patent
Kim

(10) Patent No.: US 9,535,571 B2
(45) Date of Patent: Jan. 3, 2017

(54) APPARATUS AND METHOD FOR CONTROLLING DISPLAY OF A TERMINAL ICON

(71) Applicant: Pantech Co., Ltd., Seoul (KR)

(72) Inventor: Soo Eun Kim, Seoul (KR)

(73) Assignee: Pantech Inc., Seoul (KR)

( * ) Notice: Subject to any disclaimer, the term of this patent is extended or adjusted under 35 U.S.C. 154(b) by 130 days.

(21) Appl. No.: 14/252,139

(22) Filed: Apr. 14, 2014

(65) Prior Publication Data

US 2014/0317543 A1  Oct. 23, 2014

(30) Foreign Application Priority Data

Apr. 18, 2013  (KR) .................. 10-2013-0042864

(51) Int. Cl.
*G06F 3/048* (2013.01)
*G06F 3/0481* (2013.01)

(52) U.S. Cl.
CPC ................ *G06F 3/04817* (2013.01)

(58) Field of Classification Search
CPC .................................. G06F 3/04817
USPC ........................................ 715/765
See application file for complete search history.

(56) References Cited

U.S. PATENT DOCUMENTS

| 8,775,957 | B2 * | 7/2014 | Kim | G06F 1/1626 345/619 |
| 9,384,014 | B2 * | 7/2016 | Kim | G06F 9/4445 |
| 2010/0138763 | A1 * | 6/2010 | Kim | G06F 1/1626 715/765 |
| 2010/0248788 | A1 * | 9/2010 | Yook | G06F 3/0481 455/566 |
| 2011/0055763 | A1 * | 3/2011 | Utsuki | G06F 3/04817 715/835 |
| 2011/0239145 | A1 * | 9/2011 | Kim | G06F 3/04842 715/765 |
| 2012/0009903 | A1 * | 1/2012 | Schultz | H04M 1/72519 455/412.2 |
| 2012/0036443 | A1 * | 2/2012 | Ohmori | G06F 3/0486 715/736 |
| 2013/0002725 | A1 * | 1/2013 | Kim | G06F 9/4445 345/684 |

(Continued)

FOREIGN PATENT DOCUMENTS

KR  10-2011-0109487  10/2011

*Primary Examiner* — William Titcomb
(74) *Attorney, Agent, or Firm* — H.C. Park & Associates, PLC

(57) ABSTRACT

A method for controlling display of an icon on a terminal includes displaying a first graphical object corresponding to an application, detecting a data update for the application, generating a second graphical object based on the data update, displaying the second graphical object on at least a portion of the first graphical object, in which the second graphical object corresponds to a content of the data update. An apparatus to control display of an icon includes a storage unit to store a first graphical object corresponding to an application, a detection unit to detect a data update for the application, a processing unit to generate a second graphical object based on the data update, a control unit to display the second graphical object on at least a portion of the first graphical object, in which the second graphical object corresponds to a content of the data update.

17 Claims, 15 Drawing Sheets

(a)

(b)

(56) References Cited

U.S. PATENT DOCUMENTS

| | | | |
|---|---|---|---|
| 2013/0215044 A1* | 8/2013 | Ahn | G06F 3/041 |
| | | | 345/173 |
| 2013/0268828 A1* | 10/2013 | Bucchieri | G06Q 50/01 |
| | | | 715/205 |
| 2013/0332856 A1* | 12/2013 | Sanders | G06F 3/0481 |
| | | | 715/753 |
| 2013/0332886 A1* | 12/2013 | Cranfill | G06F 3/0482 |
| | | | 715/835 |
| 2014/0115435 A1* | 4/2014 | Elseth | G06F 17/30011 |
| | | | 715/229 |
| 2014/0115508 A1* | 4/2014 | MacLean | G06F 3/0483 |
| | | | 715/764 |
| 2014/0282146 A1* | 9/2014 | Flynn | G06F 3/04842 |
| | | | 715/765 |
| 2014/0304646 A1* | 10/2014 | Rossmann | G06F 3/0482 |
| | | | 715/790 |

* cited by examiner (a)            (b)

(a)            (b)

(a)

(b)

(a)          (b)

APPARATUS AND METHOD FOR CONTROLLING DISPLAY OF A TERMINAL ICON

CROSS-REFERENCE TO RELATED APPLICATION

This application claims priority from and the benefit under 35 U.S.C. §119(a) of Korean Patent Application No. 10-2013-0042864, filed on Apr. 18, 2013, the entire disclosure of is incorporated herein by reference for all purposes.

BACKGROUND

1. Field

The following description relates to an apparatus and a method for controlling display of a terminal icon.

2. Discussion of the Background

With the wide spread of wireless terminals, such as smart phones, execution of various applications is enabled through a wireless terminal. As a user executes various applications actively or applications execute in the background, a large amount of contents and usage logs are accumulated in a wireless terminal.

A plurality of applications executed by the user in the wireless terminal are displayed on a display device of the wireless terminal in a form of a particular icon, so that the user may easily access a desired application.

When, for example, a message application is executed by the user and when a new message is received, the wireless terminal detects an update of data in response to the new message being received. When data is updated or changed in the wireless terminal, information associated with the updated or changed data may be provided to the user.

For example, when data is updated or changed, information associated with the updated or changed data may be provided to the user by changing a state of an icon displayed on the wireless terminal. More specifically, the information associated with the updated or changed data may be provided to the user by providing the icon with a particular indication based on the data update or change in response to the new message being received, such as a number of new emails that are received since the user last checked his or her email application.

However, because the information associated with the updated or changed data is only provided based on the data update or change in response to the new message being received without regard to content, the user may be alerted to check his email application for unnecessary information, such as a spam message or an advertising message may be provided to the user.

SUMMARY

Exemplary embodiments of the present invention provide an apparatus and a method for controlling display of a terminal icon.

Additional features of the invention will be set forth in the description which follows, and in part will be apparent from the description, or may be learned by practice of the invention.

Exemplary embodiments of the present invention provide a method for controlling display of an icon on a terminal includes displaying a first graphical object corresponding to an application, detecting a data update for the application, generating a second graphical object based on the data update, displaying the second graphical object on at least a portion of the first graphical object, in which the second graphical object corresponds to a content of the data update.

Exemplary embodiments of the present invention provide an apparatus to control display of an icon includes a storage unit to store a first graphical object corresponding to an application, a detection unit to detect a data update for the application, a processing unit to generate a second graphical object based on the data update, a control unit to display the second graphical object on at least a portion of the first graphical object, in which the second graphical object corresponds to a content of the data update.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
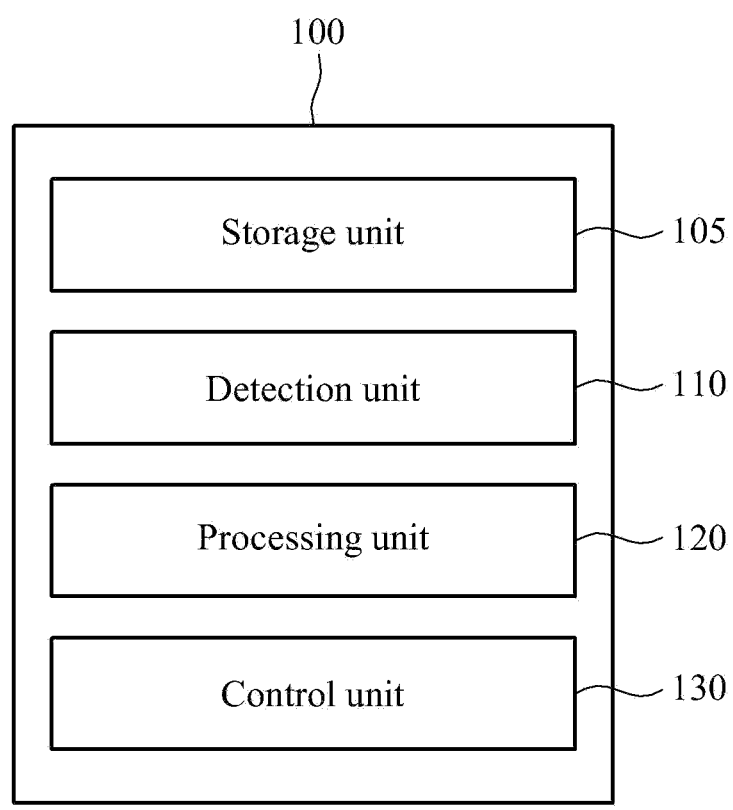
FIG. 1 is a block diagram illustrating an apparatus to control display of a terminal icon according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

FIG. 1 is a block diagram illustrating an apparatus to control display of a terminal icon according to an exemplary embodiment of the present invention.

Referring to FIG. 1, the apparatus 100 to control a display of a terminal icon includes a storage unit 105 for storage of non-transitory media, a detection unit 110, a processing unit 120, and a control unit 130.

The storage unit 105 may store a first graphical object of an application installed in the terminal. The first graphical object may correspond to a general graphical object associated with the application installed in the terminal, for example, an icon. However, aspects of the invention are not limited thereto, such that the general graphical object associated with the application may include various graphical images.

The detection unit 110 of the apparatus may detect an update of data associated with the terminal in real time. The data associated with the terminal may include data stored in the terminal and/or data associated with the application installed, stored, or executed in the terminal. For example, when a new message is received on the terminal, the detection unit 110 may detect an update of data of an application associated with the message. The detection unit 110 may detect such update of data in real time. However, aspects of the invention are not limited thereto, such that the detection unit 110 may detect an update of data according to scheduled or reference intervals of time.

When the update of the data is detected by the detection unit 110, the processing unit 120 may determine whether the updated data satisfies one or more graphical object change conditions and may classify the updated data. When the updated data satisfies the graphical object change condition(s), the processing unit 120 may generate a second graphical object for the updated data.

According to aspects of the invention, one or more graphical object change conditions may be set based on a user log of the terminal. The user log may refer to an activity history of the terminal, which may be recorded while the user of the terminal is using the terminal or while the terminal is active. The user log may be accumulated or generated as the user uses various applications, whether consciously or unconsciously, actively or in a background. The graphical object change condition(s) may be set based on the user log.

The processing unit 120 may determine whether the updated data satisfies the graphical object change condition(s). When the updated data is determined to satisfy the graphical object change condition(s), the processing unit 120 may generate the second graphical object for the updated data, and the control unit 130 may exert control to display the second graphical object so that information (e.g., alert, alarm, or the like) associated with the updated data may be provided to the user in a customized manner.

According to aspects of the invention, one or more graphical object change condition(s) that may be set based on the user log may be based on a frequency of contact with a person or entity included in contacts on a phone book or directory. For an application in which data generation on the terminal is associated with a person or an entity (e.g., a message application, a phone call application, and the like) the graphical object change condition(s) may be set based on a frequency of contact with the respective person or entity by the corresponding application and/or a rank in a friend or favorite list.

A more detailed description of generating and providing the second graphical object for the updated data is provided with reference to FIGS. 2 through 14.

According to aspects of the invention, as the user uses various applications actively or in the background, the terminal may generate one or more logs for various contents may be accumulated as well as a user log. For example, log for a content may refer to whether the terminal is using or accessing a particular content and/or whether the particular content is being used or accessed frequently. The graphical object change condition may be set based on whether a content generated in the terminal is used.

According to aspects of the invention, the content may correspond to an image content, a video content, an audio content, or the like. Further, the content may include a content generated by the user as well as a content provided by the terminal.

According to aspects of the invention, the graphical object change condition may be set based on user social network activity information. The social network activity information may include, without limitation, an activity history of the user on a particular social network, such as, for example, user's access to or use of a particular social network, activity information on the particular social network, a rank of a friend having frequent contacts on the particular social network, a number of times (frequency) of contacts, and the like.

According to aspects of the invention, the second graphical object associated with the updated data may include at least one of a number of the updated data (e.g., numerical representation), an amount of the updated data (e.g., quantitative representation), or a content of the updated data (e.g., preview).

For example, when a message is received, the detection unit 110 may detect the received message, and the processing unit 120 may generate a second graphical object for the updated data if the received message satisfies the graphical object change condition. The second graphical object may correspond to a number of received messages (e.g., numerical or quantitative representation). Further, when an image or a video is attached to the received message, the second graphical object may include partial information (e.g., preview), such as a thumbnail of the attached image or video.

According to aspects of the invention, the processing unit 120 may determine whether the updated data satisfies the graphical object change condition. Based on the determination, the second graphical object associated with the updated data may be generated, and the second graphical object may be displayed on at least a portion of the first graphical object by the control unit 130. Also, the control unit 130 may exert control to change the first graphical object to the second graphical object and display the second graphical object in place of the first graphical object.

According to aspects of the invention, the apparatus 100 may determine whether the updated data corresponds to dormant data by comparing the updated data to the graphical object change condition, and may generate the second graphical object associated with the updated data. Further, the apparatus 100 may provide the user with information associated with the updated data through a portion of the first graphical object, thereby providing the user after filtering out some information, which may be less relevant to the user.

The graphical object change condition may be set based on at least one of a log of the terminal, a determination of whether the content generated on the terminal is used (or content use history), and social network activity information of the terminal. However, aspects of the invention are not limited thereto, such that for a particular person or a particular content, the graphical object change condition may be preset by the user.

According to aspects of the invention, when the control unit 130 exerts controls to display the second graphical object associated with the updated data on at least a portion of the first graphical object, the control unit 130 may exert control to display a different color value of at least a portion of the second graphical object based on the graphical object change condition. For example, when a message is received from a friend having frequent contacts or that corresponds frequently, and a determination of whether the received message satisfies the graphical object change condition set based on the user log is made by the processing unit 120, and the second graphical object may indicate, for example, a number of messages. Further, if an image or a video is attached to the message, a partial image (thumbnail) of the attached image or video may be generated as the second graphical object.

The control unit 130 may exert control to display the second graphical object on at least a portion of the first graphical object. For example, the control unit 130 may exert control to further display a second graphic object, such as, for example, a number of received messages and/or a partial image of an image or a video attached to the received message, on at least a portion of an icon associated with the message, for example, a first graphical object. Also, the control unit 130 may exert control to provide the user with a different color value of at least a portion of the second graphical object, such as, for example, a number of messages received from a friend having frequent contacts.

According to aspects of the invention, the second graphical object may include at least a portion of content associated with the updated data. For example, when a message having content attached thereto, such as an image or a video, is received, the second graphical object may include a partial image (e.g., a thumbnail) of the image or video attached to the received message and/or a number of received messages. The control unit 130 may display the second graphical object on at least a portion of the first graphical object, and when the user of the terminal receives a new message, the user may view the partial image of the image or video attached to the received message.

Further, when a portion of the content associated with the second graphical object is displayed on at least a portion of the first graphical object, or when the second graphical object is displayed in place of the first graphical object, the control unit 130 may exert control to further display a function key of a relevant application for operating a portion of the content.

For example, when a message having a video attached thereto is received, the detection unit 110 may detect an update of data associated with the message, and the processing unit 120 may determine whether the updated data satisfies the graphical object change condition and may generate a second graphical object. When a message having a video file attached thereto is received, the second graphical object may include a number of received messages and/or a portion of the attached video file (e.g., a portion of the content).

The control unit 130 may exert control to display a number of received messages and/or a portion of the attached video file on at least a portion of the first graphical object. Also, the control unit 130 may exert control to display the function key of the relevant application for operating the attached video, for example, a play key for playing a video, on at least a portion of the first graphical object. A more detailed description may be provided through various exemplary embodiments with reference to FIGS. 2 through 14.

Figure 2:
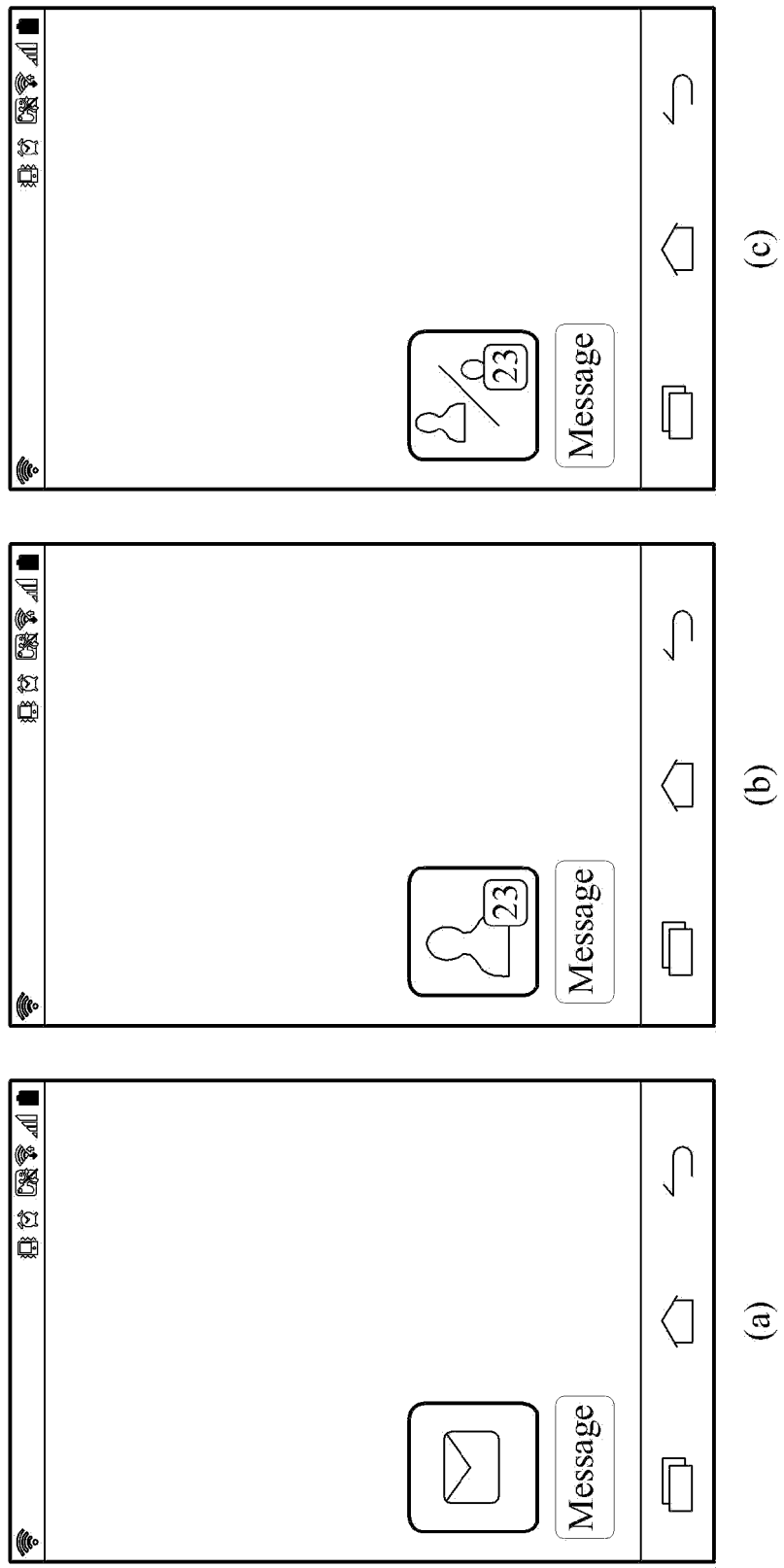
FIG. 2 is a diagram illustrating controlling display of a terminal icon associated with a messaging application according to an exemplary embodiment of the present invention.

FIG. 2 is a diagram illustrating controlling display of a terminal icon associated with a messaging application according to an exemplary embodiment of the present invention.

In screen (a) of FIG. 2, an existing screen of the terminal displaying the icon associated with the message is shown.

The apparatus 100 of FIG. 1 may classify the updated data based on the graphical object change condition, and may display a second graphical object associated with the updated data on at least a portion of the icon of the first graphical object. Referring to screen (b) of FIG. 2, when a message is received, an icon representing a profile image of a friend who sent the message and a number of messages to be verified by the user is shown. However, aspects of the invention are not limited thereto, such that less or more information may be displayed.

The detection unit 110 of FIG. 1 may detect the message being received by detecting an update and change of data associated with the terminal. Further, the update and/or change of data associated with the terminal may be detected in real time or at reference time intervals. When the received message is detected, the processing unit 120 of FIG. 1 may classify the received message based on the graphical object change condition and may generate at least one second graphical object associated with the received message (e.g., updated message).

Further, the at least one second graphical object associated with the received message may include at least one of a number of received messages, a sender profile image of the received message, and information associated with an attached file included in received message. The control unit 130 of FIG. 1 may exert control to display the second graphical object on at least a portion of the first graphical object.

Referring again to screen (b) of FIG. 2, the second graphical object, which may include a profile image of the person sending the message and a number of unread messages sent by the respective person may be displayed on at least a portion of an icon associated with the message.

Referring to screen (c) of FIG. 2, when new messages are transmitted from a plurality of senders, the terminal may receive new messages transmitted from the plurality of senders, and the detection unit 110 of FIG. 1 may detect the new messages being received. When new messages from the plurality of senders are received, a plurality of profile images may be displayed on an icon associated with the messages based on the graphical object change condition. For example, in screen (c) of FIG. 2, two profile images are displayed. The graphical object change condition may be set by the user of the terminal. Although an icon displaying two profile images is shown in screen (c) of FIG. 2, aspects of the invention are not limited in this regard, such that a different number of profile images to be displayed on the icon may be set by the user or based on the graphical object change condition. Further, the profile images may be displayed simultaneously or sequentially, one or more at a time.

According to aspects of the invention, the graphical object change condition may be set based on a user log, which may indicate a friend or person that may be frequently contacted using the terminal, for example, a friend that may have transmitted and/or received messages to and from within a reference period of time, frequency of calls to/from a friend, duration of a call with a friend, and the like. Also, the graphical object change condition may be set based on a friend/contact list separately set by the user of the terminal.

Further, when the apparatus 100 of FIG. 1 receives the message from a friend/person having frequent contacts with the user based on the graphical object change condition, the apparatus 100 may prioritize the corresponding message and may display a profile image of the received message and a number of the received messages according to the prioritization.

When a file is attached to the received message, both a profile image of the sender of the message and a portion of the attached file may be displayed on the icon associated with the message. The information associated with the attached file may be provided to the user by displaying a portion of the attached file on the icon associated with the message. For example, the information associated with the attached file may be displayed as a thumbnail on the icon associated with the message when the attached file is an image or a video. Further, the information associated with the attached file may be provided to the user by displaying a particular icon representing that the attached file is included in the received mail or message.

Further, when a message including an attached file is received, the apparatus 100 of FIG. 1 may further display a function key for operating a relevant application associated with the attached file. For example, when a message having an attached video is received on the terminal, at least one of a profile image of a sender sending the message and a partial image or partial video of the attached video may be displayed on at least a portion of the icon associated with the message, and a function key (e.g., a play key, a pause key, and the like) of a relevant application for playing the attached video (e.g., a media playback and the like) may be displayed together.

According aspects of the invention, when a message including an attached file is received, the user may recognize whether an important message is received, whether an attached file is included, and/or what type of file is an attached file only by seeing an icon associated with the message. Further, the user may also recognize the attached file through a use of the function key without first checking the content of the received message.

For example, when a message is received from an external source, the detection unit 110 may detect an update of data in response to the message being received. The updated data may be classified by the graphical object change condition set based on the user log. The processing unit 120 may determine or verify whether a sender of the received message is a person having frequent contacts, categorized as a favorite, or is in a high rank of the friend list, based on the graphical object change condition. When the sender is a person having frequent contacts, categorized as a favorite, or is in a high rank of the friend list, the processing unit 120 may generate the second graphical object associated with the updated data (e.g., the received message).

Figure 3:
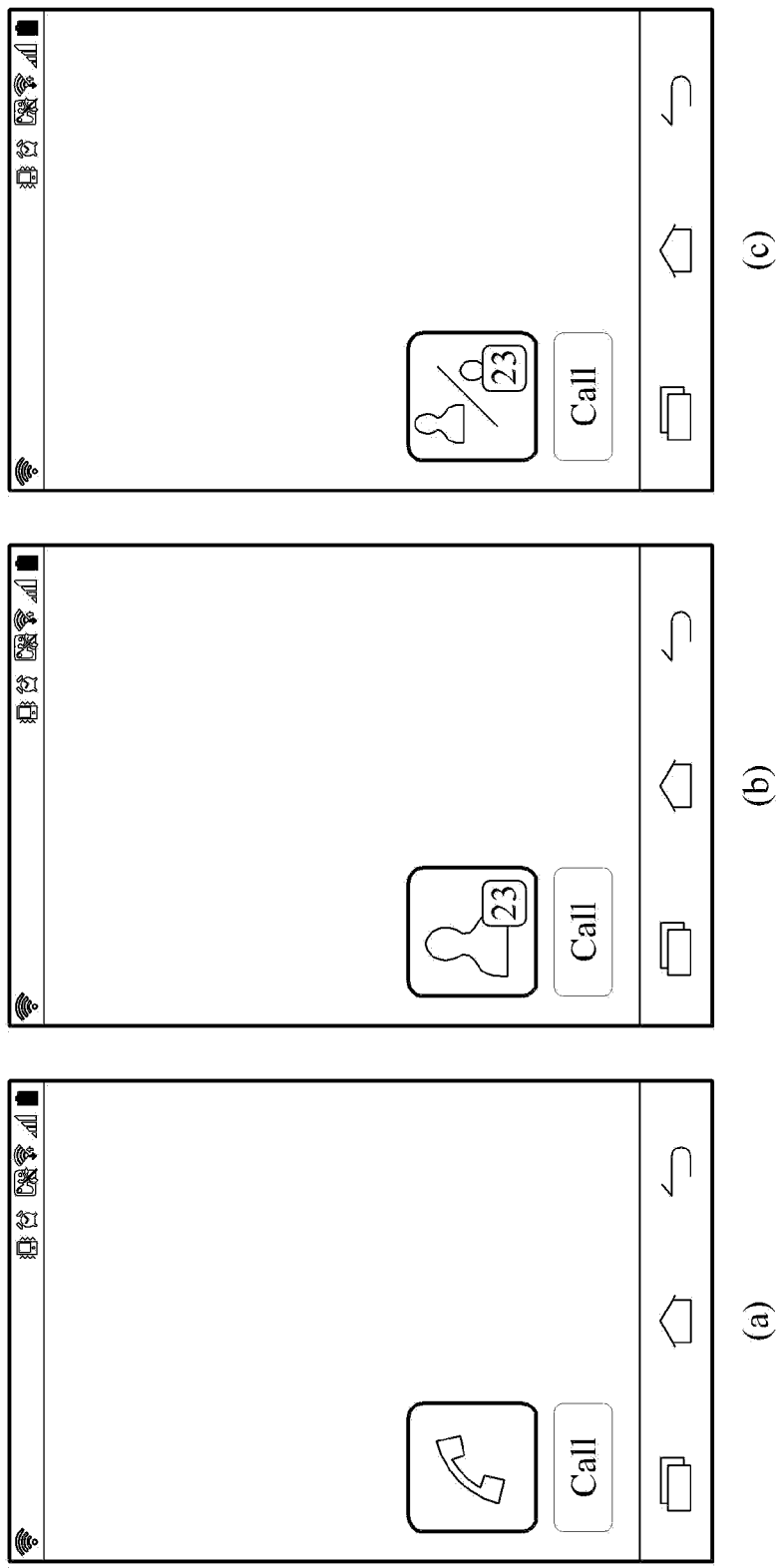
FIG. 3 is a diagram illustrating controlling display of a terminal icon associated with a calling application according to an exemplary embodiment of the present invention.

FIG. 3 is a diagram illustrating controlling display of a terminal icon associated with a calling application according to an exemplary embodiment of the present invention.

When data associated with a call is updated, the apparatus 100 of FIG. 1 may display information associated with the updated data on at least a portion of an icon associated with the call.

In screen (a) of FIG. 3, an existing screen of the terminal displaying the icon associated with the call is shown. Referring to screen (b) of FIG. 3, when a request for the call occurs, data associated with the received call (e.g., updated data) may be classified based on a preset standard and a second graphical object (e.g., information associated with the received call) is displayed on at least a portion of the icon associated with the call.

Further, referring to screen (b) of FIG. 3, the apparatus 100 of FIG. 1 may display information associated with the received call on at least a portion of the icon associated with the call. An image displayed on at least a portion of the icon associated with the call may correspond to an image of a caller of a latest call. Also, when a missed call occurs, the apparatus 100 may display a number of missed calls on at least a portion of the icon associated with the call as well as the image of the caller.

Referring to screen (c) of FIG. 3, when missed calls occur from a plurality of callers, the apparatus 100 may display profile images of two callers of latest missed calls on at least a portion of the icon associated with the call. However, aspects of the invention are not limited thereto, such that profile images of two or more callers of earliest missed calls or calls from a person included in a prioritized list or group may be displayed on a portion of the icon. Also, when two or more missed calls were originated from the same caller, the apparatus 100 may display a number of missed calls and a profile image of the same caller irrespective of order of call. Further, when two or more missed calls were originated from the same caller, the apparatus 100 may change a color value of at least a portion of the icon associated with the call and/or may notify the user that a plurality of requests to conduct a call has occurred.

According to aspects of the invention, when two or more missed calls were originated two or more callers each, the apparatus 100 may display profile images of the callers and a number of the missed calls in a descending chronological order. However, aspects of the invention are not limited thereto, such that the profile images of the callers and the number of missed calls may be displayed according to the number of missed calls. Further, when there is no profile image of the callers, a basic image of the terminal or other preconfigured image may be displayed.

Figure 4:
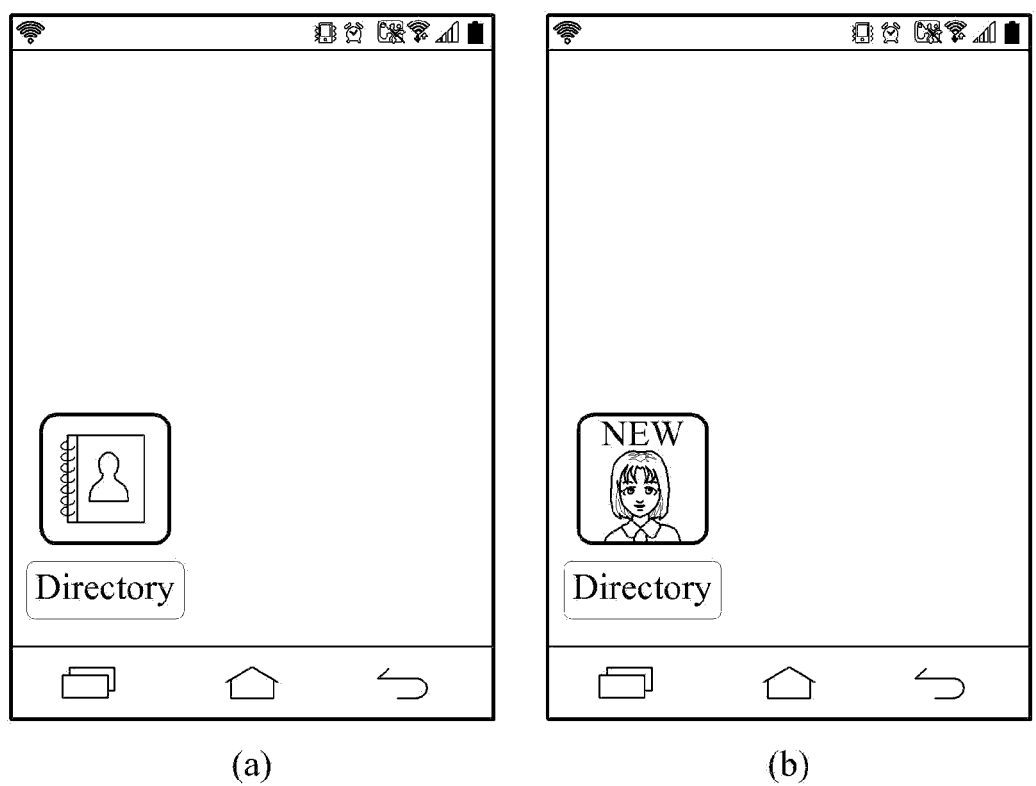
FIG. 4 is a diagram illustrating controlling display of a terminal icon associated with a phone book application according to an exemplary embodiment of the present invention.

FIG. 4 is a diagram illustrating controlling display of a terminal icon associated with a phone book application according to an exemplary embodiment of the present invention.

When data associated with the phone book (e.g., phone directory) of the terminal is updated, the apparatus 100 may display information associated with the updated data on at least a portion of an icon associated with the phone book.

In screen (a) of FIG. 4, an existing screen of the terminal displaying the icon associated with the phone book of the terminal is shown. Referring to screen (b) of FIG. 4, when data associated with the phone book is updated, the apparatus 100 may classify the updated data based on a preset standard and display a second graphical object associated with the updated data on at least a portion of the icon associated with the phone book.

When a new phone book entry is added to the terminal or there is a change in a profile of a contact stored in the phone book of the terminal, the apparatus 100 of FIG. 1 may detect the added or changed data. The processing unit 120 of FIG. 1 may classify the added or changed data being detected based on the graphical object change condition, and may generate a second graphical object associated with the added or changed data. The control unit 130 of FIG. 1 may exert control to display the second graphical object associated with the added or changed data on at least a portion of the icon associated with the phone book.

Further, referring again to screen (b) of FIG. 4, when a new phone book entry is added to the phone book of the terminal or there is a change in a profile of a contact stored in the phone book, the apparatus 100 may enable an image included in the added profile or the changed profile to be displayed on at least a portion of the icon associated with the phone book. For example, when profiles of a plurality of friends are added or changed, two of the most recently added or changed profile images may be displayed on at least a portion of the icon associated with the phone book. However, aspects of the invention are not limited thereto, such that the profiles may be displayed according to grouping of the profile, earliest added or changed profile images, or the like. Further, profile images that may be displayed on at least a portion of the icon associated with the phone book are not limited to two profile images, and a number of profile images displayable on at least a portion of the icon may be pre-defined by the user.

When there is a change in a group and/or a profile of a particular friend included in the phone book, the apparatus 100 may output the corresponding group and the profile image of the particular friend to a portion of the icon associated with the phone book. Further, the profile image of the particular friend may be set for the group in the phone book based on at least one of an extent to which messages are transmitted and/or received during a reference period of time, a call frequency, a call duration, social network activity information, and may be preset by the user directly.

Figure 5:
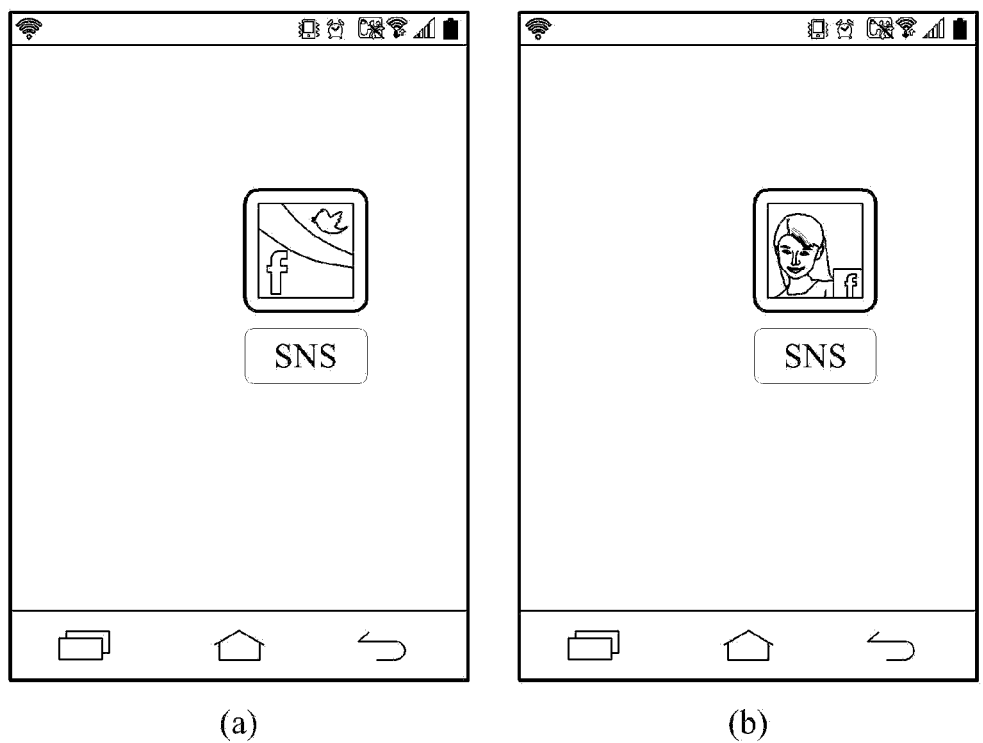
FIG. 5 is a diagram illustrating controlling display of a terminal icon associated with a social network service (SNS) application according to an exemplary embodiment of the present invention.

FIG. 5 is a diagram illustrating controlling display of a terminal icon associated with a social network service (SNS) application according to an exemplary embodiment of the present invention.

When data associated with the SNS is updated, the apparatus 100 may display information associated with the updated data on at least a portion of an icon associated with the SNS.

In screen (a) of FIG. 5, an existing screen of the terminal displaying the icon associated with the SNS is shown. Referring to screen (b) of FIG. 5, when data associated with the SNS is updated, the apparatus 100 may classify the updated data based on the graphical object change condition and display information associated with the updated data on at least a portion of the icon associated with the SNS.

Further, referring again to screen (b) of FIG. 5, the apparatus 100 may display at least one of a preview image of a newly updated post on the SNS, a number of newly updated messages, and an updated friend image, on at least a portion of the icon associated with the SNS. Further, although not shown, the apparatus 100 may output two of the most recently updated profile images or posts to the icon. Although two profile images or posts are described for convenience of description, aspects of the invention are not limited thereto, such that a number of profile images or posts may be three or more.

According to aspects of the invention, the graphical object change condition associated with the SNS may be set based on at least one of user social network activity information, for example, a friend that has sent and/or received reference number of social messages during a predetermined period of time and a friend having frequent contacts, for example, a friend that makes comments on user's posts and vice-versa.

Further, when a friend having frequent contacts with the user of the terminal on the SNS performs an update, the respective friend may be given first priority and a profile image of the respective friend or a number of updates may be displayed on at least a portion of the icon associated with the SNS.

When the updated data on the SNS includes an image, the apparatus 100 may display the updated image on at least a portion of the icon associated with the SNS. Further, when the updated data on the SNS includes a video, the apparatus 100 may display a portion of the video on at least a portion of the icon associated with the SNS, and may further display a function key (e.g., a play key) of a relevant application for playing the video.

Figure 6:
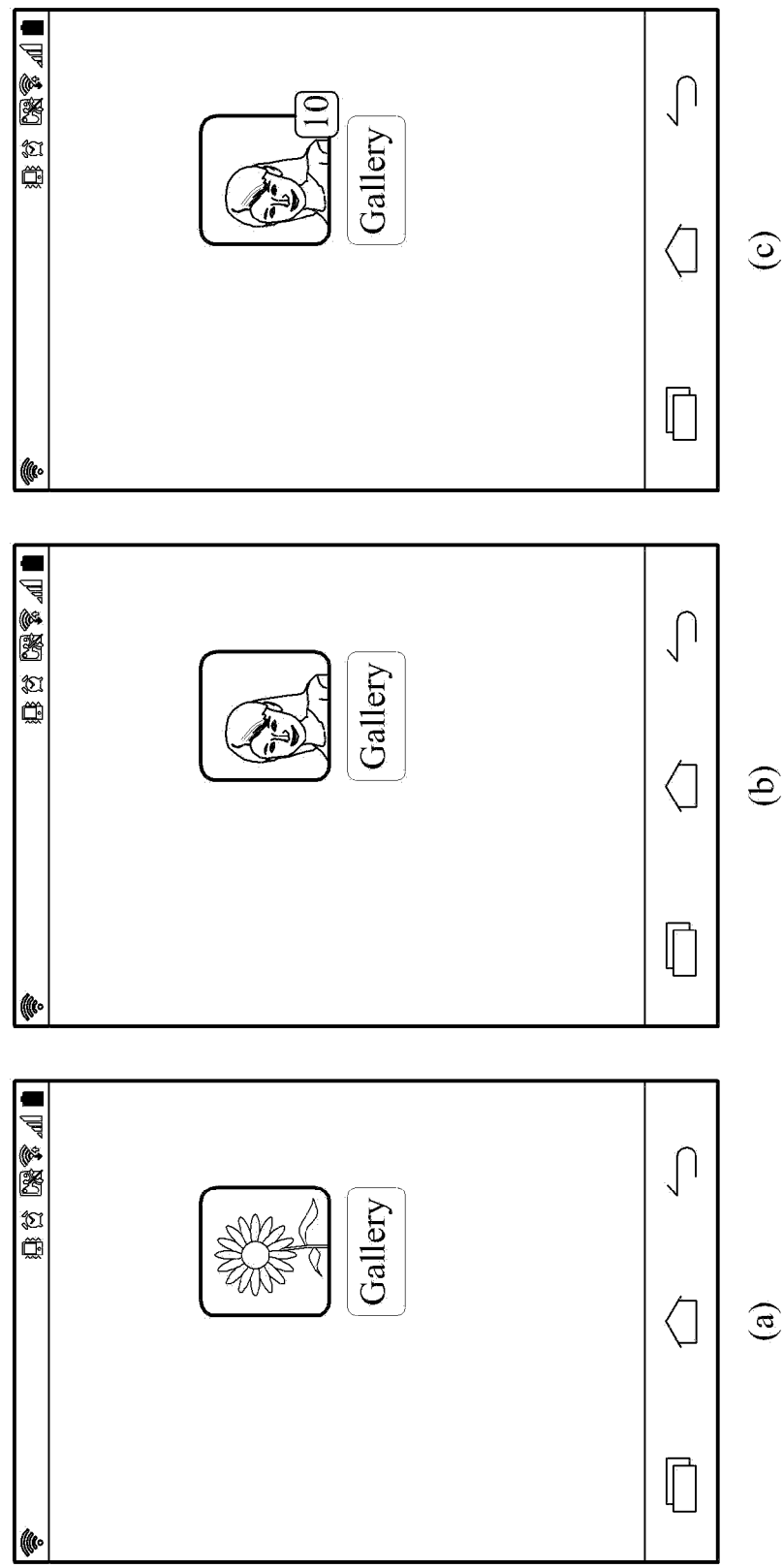
FIG. 6 is a diagram illustrating controlling display of a terminal icon associated with a gallery application according to an exemplary embodiment of the present invention.

FIG. 6 is a diagram illustrating controlling display of a terminal icon associated with a gallery application according to an exemplary embodiment of the present invention.

When data associated with a gallery application is updated, the apparatus 100 may display information associated with the updated data on at least a portion of the icon associated with the gallery application. The gallery application may refer to a program enabling image data or video data to be displayed or played on the terminal.

In screen (a) of FIG. 6, an existing screen of the terminal displaying the icon associated with the gallery is shown. Referring to screen (b) and screen (c) of FIG. 6, when data associated with the gallery application is updated, the updated data may be classified based on the graphical object change condition and information associated with the updated data may be displayed on at least a portion of the icon associated with the gallery application. For example, data associated with the gallery application may be updated, without limitation, when a photo is taken with a camera, when image data is captured, or when an image is downloaded, and the like.

Referring to screen (b) of FIG. 6, the apparatus 100 may display a photo stored recently in the terminal on at least a portion of the icon associated with the gallery.

Further, referring to screen (c) of FIG. 6, the apparatus 100 may also display information representing a number of images when a plurality of images are downloaded. For example, ten photos may be downloaded concurrently in screen (c) of FIG. 6. Further, when a plurality of images are downloaded in the terminal, the apparatus 100 may display a plurality of images downloaded recently on at least a portion of the icon associated with the gallery as a slide show as well as a number of the downloaded images.

The graphical object change condition may be set based on a folder in which a photo to be displayed on at least a portion of the icon associated with the gallery belongs. For example, when a photo in a camera folder is updated, the photo may be displayed on at least a portion of the icon associated with the gallery. The graphical object change condition may be set by the user, and a plurality of folders may be selected.

According to aspects of the invention, the graphical object change condition may be set based on a predetermined time period, for example, a photo taken within a particular time period. For example, when there is a photo taken (or an image downloaded) within a particular time period (e.g., within one hour or one day from now), the photo or image may be displayed on at least a portion of the icon associated with the gallery. When there is no photo taken (or image downloaded) in the particular time period, a basic image may be displayed.

When a photo or image including a face image is updated, the apparatus 100 may crop and display the face image on at least a portion of the icon associated with the gallery. For a general photo, the apparatus 100 may reduce the general photo, crop the center of the photo, and display the photo.

Further, the apparatus 100 may display a photo or an image, which may be received from a friend, downloaded, or stored within a particular time period, on at least a portion of the icon associated with the gallery in a message application such as, for example, KakaoTalk®. Further, when the respective photo or image is displayed on at least a portion of the icon associated with the gallery in a message application, the apparatus 100 may display a name or identity (ID) of the friend transmitting the photo or image together. When the person (or group) transmitting the photo or image is two or more, names of at least two persons (or groups) transmitting the photo or image most recently may be displayed. However, aspects of the invention are not limited thereto, such that a maximum number of friends or groups of which names are displayed on at least a portion of the icon associated with the gallery may be pre-defined by the user.

Figure 7:
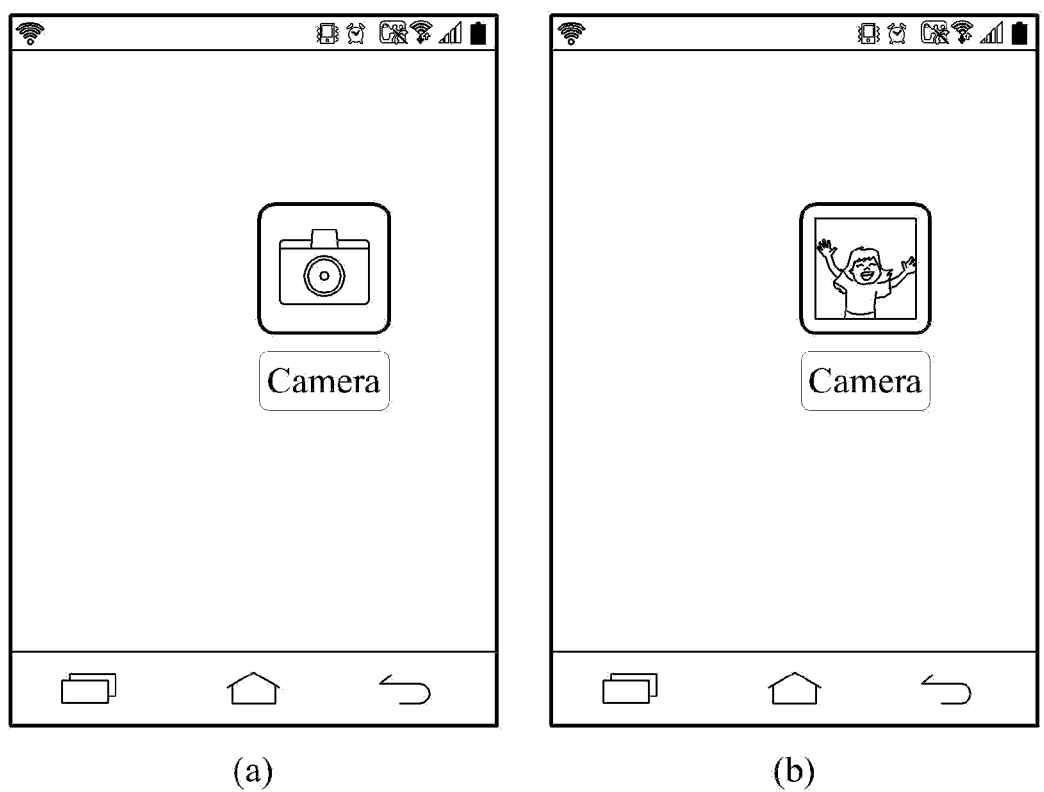
FIG. 7 is a diagram illustrating controlling display of a terminal icon associated with a camera application according to an exemplary embodiment of the present invention.

FIG. 7 is a diagram illustrating controlling display of a terminal icon associated with a camera application according to an exemplary embodiment of the present invention.

When data associated with a camera application is updated, the apparatus 100 may display information associated with the updated data on at least a portion of the icon associated with the camera application.

In screen (a) of FIG. 7, an existing screen of the terminal displaying the icon associated with the camera is shown. Referring to screen (b) of FIG. 7, when data associated with the camera application is updated, the apparatus 100 may classify the updated data based on the graphical object change condition and may display information associated with the updated data on at least a portion of the icon associated with the camera application.

According to aspects of the invention, the apparatus 100 may display a photo taken most recently with the camera of the terminal on at least a portion of the icon associated with the camera application. When there is no previously captured photo, an existing camera icon may be displayed. The apparatus 100 may display a thumbnail of a captured photo or video on at least a portion of the icon associated with the camera application. If a photo is taken with an Ahead Of Time (AOT) camera on a home screen of the terminal, the photo may be displayed on at least a portion of the icon associated with the camera as a slide show.

Figure 8:
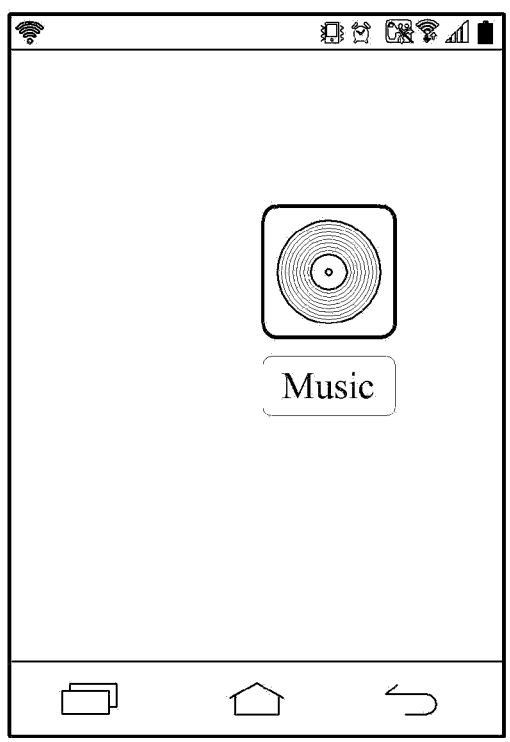
FIG. 8 is a diagram illustrating controlling display of a terminal icon associated with an audio player application according to an exemplary embodiment of the present invention.
Figure 8:
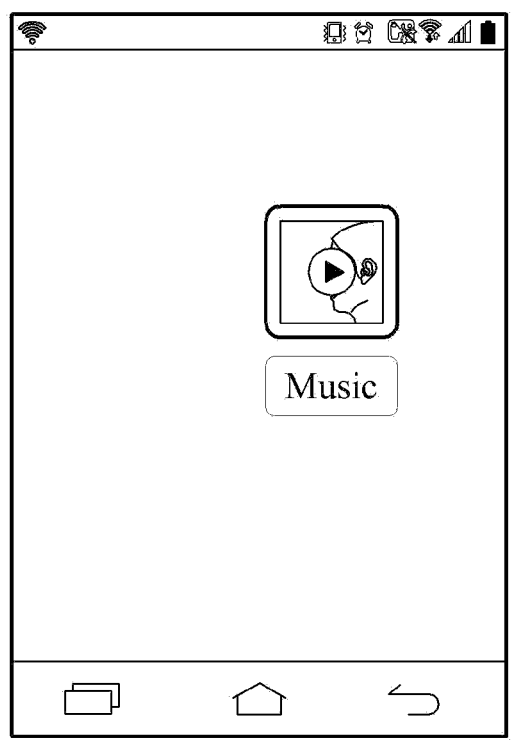

FIG. 8 is a diagram illustrating controlling display of a terminal icon associated with an audio player application according to an exemplary embodiment of the present invention.

When data associated with the audio player is updated, the apparatus 100 may display the second graphical object for the updated data on at least a portion of the icon associated with the audio player.

In screen (a) of FIG. 8, an existing screen of the terminal displaying the icon associated with the audio player is shown. Referring to screen (b) of FIG. 8, when a particular music is played in the audio player, an album cover art corresponding to the music being played and a function key of the audio player (e.g., a play key, a pause key, a next track key, a previous track key, and the like) may be displayed together on at least a portion of the icon associated with the audio player. However, aspects of the invention are not limited thereto, such that the album cover art and the function key may be displayed separately.

According to aspects of the invention, when music is played with the audio player, a function key associated with the audio player may be displayed on at least a portion of the icon associated with the audio player. Further, the function key to be displayed on at least a portion of the icon associated with the audio player may be preset by the user.

When there is no music being played or no music list played recently in the audio player, the apparatus 100 may display an album cover art of a recommended music on at least a portion of the icon associated with the audio player. The recommended music may correspond to a music played by the user frequently during a predetermined period of time or a music list designated separately by the user. For example, music may be provided based on at least one of a biorhythm of the user, and ranking of a song with respect to a popularity chart, which may be provided in real-time, daily, or weekly.

Figure 9:
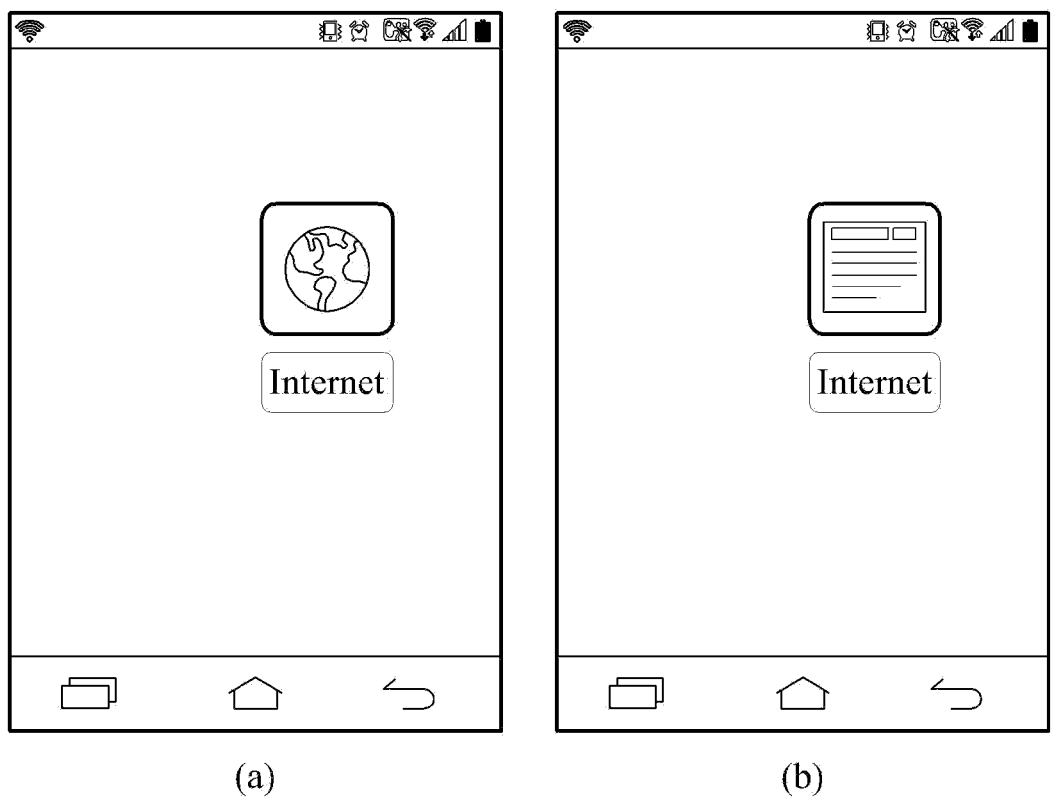
FIG. 9 is a diagram illustrating controlling display of a terminal icon associated with a web browsing application according to an exemplary embodiment of the present invention.

FIG. 9 is a diagram illustrating controlling display of a terminal icon associated with a web browsing application according to an exemplary embodiment of the present invention.

When data associated with the web browsing application is updated, the apparatus 100 may display information associated with the updated data on at least a portion of the icon associated with the web browsing application.

In screen (a) of FIG. 9, an existing screen of the terminal displaying the icon associated with the web browsing application is shown. Referring to screen (b) of FIG. 9, when data associated with the web browsing application is updated, information associated with the updated data based on the graphical object change condition may be classified and displayed on at least a portion of the icon associated with the web browsing application.

Referring again to screen (b) of FIG. 9, the apparatus 100 may display an image (e.g., captured image) of a web page, for which the user of the terminal may have searched recently using the web browsing application, on at least a portion of the icon associated with the web browsing application. When a plurality of web browsing tabs are active in the web browsing application, a web page displayed on the active tab may be captured and displayed on at least a portion of the icon associated with the web browsing application.

Further, even when a recently found web page is navigated to a wrong web page, the apparatus 100 may display the recently found web page on at least a portion of the icon associated with the web browsing application. When the web page is not captured normally, a basic image may be displayed.

Figure 10:
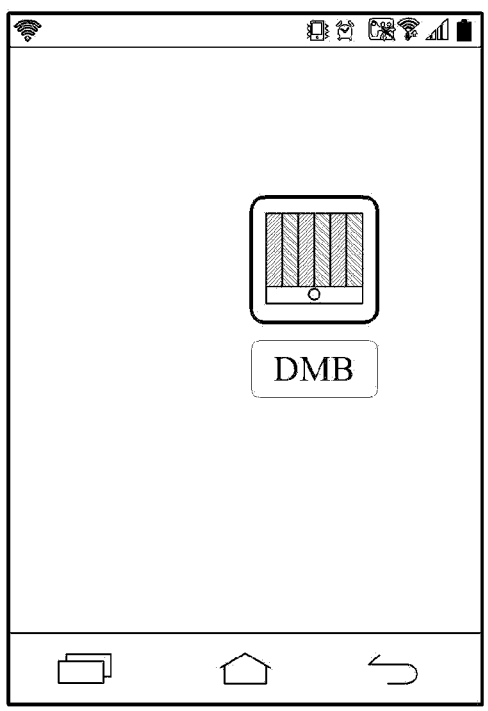
FIG. 10 is a diagram illustrating controlling display of a terminal icon associated with a broadcasting application according to an exemplary embodiment of the present invention.
Figure 10:
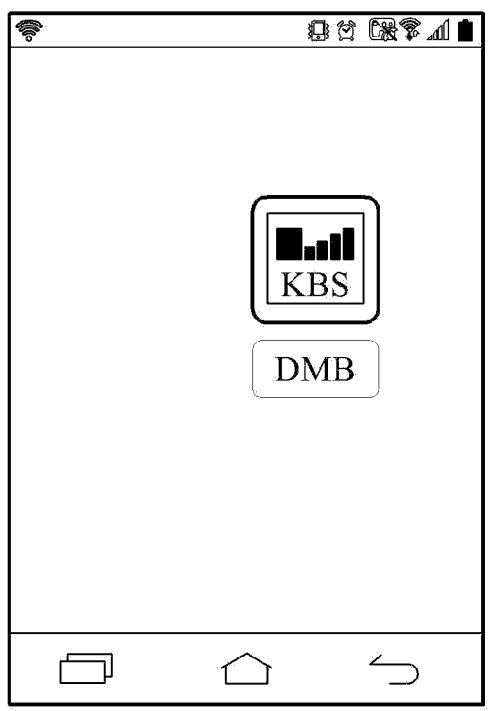

FIG. 10 is a diagram illustrating controlling display of a terminal icon associated with a broadcasting application according to an exemplary embodiment of the present invention.

When data associated with the broadcasting application, such as, for example, a digital multimedia broadcasting (DMB) application is updated, the apparatus 100 may display information associated with the updated data on at least a portion of the icon associated with the broadcasting application.

In screen (a) of FIG. 10, an existing screen of the terminal displaying the icon associated with the broadcasting application is shown. Referring to screen (b) of FIG. 10, when data associated with the broadcasting application is updated, information associated with the updated data may be classified based on the graphical object change condition and displayed on at least a portion of the icon associated with the broadcasting application.

Referring again to screen (b) of FIG. 10, the apparatus 100 may display information associated with a broadcast viewed recently on at least a portion of the icon associated with the broadcasting application. Also, the apparatus 100 may list up broadcasts viewed within a reference timeframe (e.g., within several hours or several days) for a particular period of time or longer (e.g., thirty minutes or longer), and may display three broadcasts on at least a portion of the icon as a slide show. However, aspects of the invention are not limited thereto, such that less than or more than three broadcasts may be displayed on the portion of the icon. Further, when a unique icon of a broadcasting service company is displayable, the unique icon of the broadcasting service company may be displayed. When a unique icon of a broadcasting service company is not displayable, the broadcasting service company may be displayed as text.

Further, although not shown, the apparatus 100 may display a time and information of a broadcast set up for reserved viewing by the user (e.g., a name of the broadcast or an image associated with the broadcast) on at least a portion of an icon associated with the broadcasting application.

According to aspects of the invention, the apparatus 100 may display a reception sensitivity of the broadcasting application. For example, a signal strength of the broadcast application, such as a DMB application, may be displayed on at least a portion of the icon associated with the broadcasting application. When a previously viewed broadcast does not exist, a basic image may be displayed.

Figure 11:
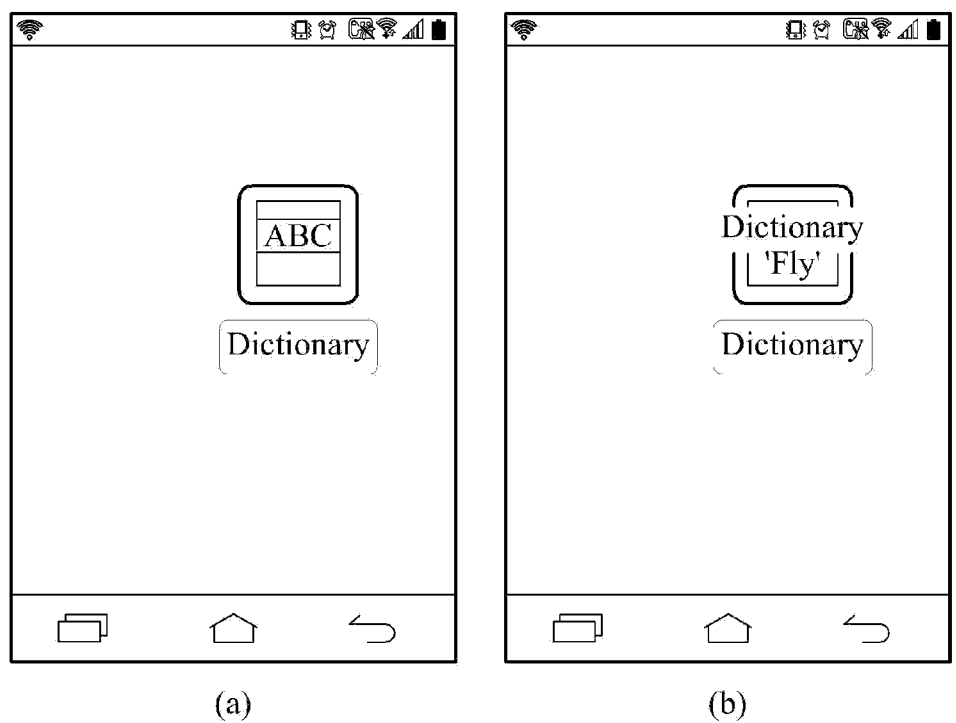
FIG. 11 is a diagram illustrating controlling display of a terminal icon associated with a dictionary application according to an exemplary embodiment of the present invention.

FIG. 11 is a diagram illustrating controlling display of a terminal icon associated with a dictionary application according to an exemplary embodiment of the present invention.

When data associated with the dictionary application is updated, the apparatus 100 may display the second graphical object for the updated data on at least a portion of the icon associated with the dictionary application.

In screen (a) of FIG. 11, an existing screen of the terminal displaying the icon associated with the dictionary application is shown. Referring to screen (b) of FIG. 11, when data associated with the dictionary application is updated, the second graphical object for the updated data may be displayed on at least a portion of the icon associated with the dictionary application when the updated data satisfies the graphical object change condition. The apparatus 100 may display a most recently looked-up word on at least a portion of the icon associated with the dictionary application.

Further, the apparatus 100 may control a display of an icon of the terminal associated with a memo application of the terminal. When data associated with the memo application is updated, the apparatus 100 may display information associated with the updated data on at least a portion of the icon associated with the memo application. The memo application may refer to an application enabling the user to take a memo on the terminal.

According to aspects of the invention, the apparatus 100 may display a thumbnail image of a last prepared memo on at least a portion of the icon associated with the dictionary application. When the last prepared memo corresponds to a protected file, a thumbnail image of a most recently prepared or stored unprotected memo may be displayed. When there is no content associated with a memo or there is only a memo of a protected file, a basic image may be displayed on the icon associated with the memo application.

Figure 12:
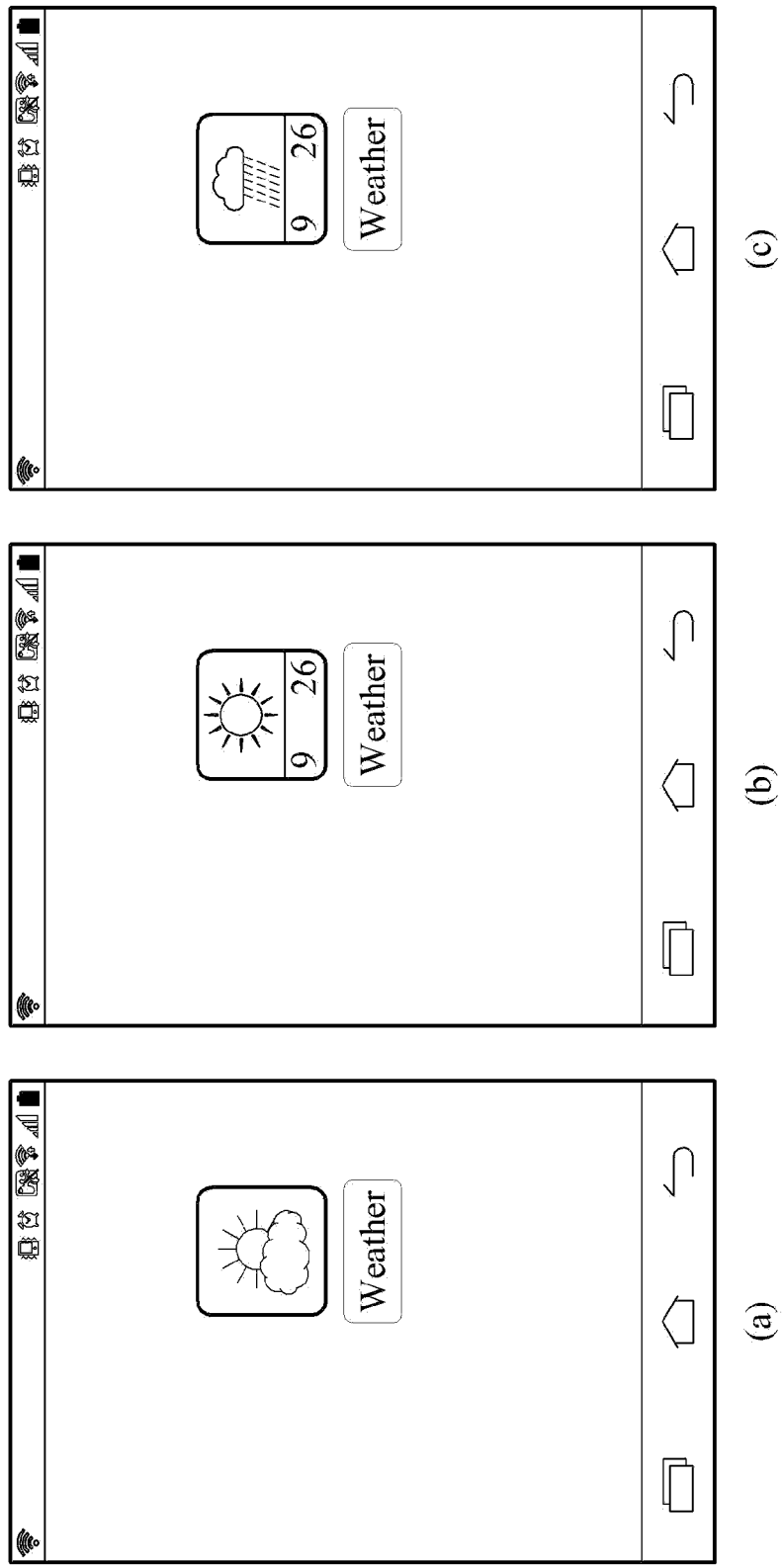
FIG. 12 is a diagram illustrating controlling display of a terminal icon associated with a weather application according to an exemplary embodiment of the present invention.

FIG. 12 is a diagram illustrating controlling display of a terminal icon associated with a weather application according to an exemplary embodiment of the present invention.

When data associated with the weather application is updated, the apparatus 100 may display information associated with the updated data on at least a portion of the icon associated with the weather application.

In screen (a) of FIG. 12, an existing screen of the terminal displaying the icon associated with the weather application is shown. Referring to screen (b) and screen (c) of FIG. 12, when data associated with the weather application is updated, information associated with the updated data is displayed on at least a portion of the icon associated with the weather application.

Further, referring again to screen (b) and screen (c) of FIG. 12, the apparatus 100 may display weather information, which may be updated at reference time intervals, on at least a portion of the icon associated with the weather application. The weather information may correspond to a preset item by the user, for example, lowest temperature, highest temperature, and the like. Also, the weather information may correspond to weather information of a region designated by the user. When there is a change in a location of the user by tracking the location of the user, the weather information at the changed location may be displayed.

When there is a change in weather information in comparison with current weather, the apparatus 100 may detect the corresponding information and may display the changed weather information on at least a portion of the icon associated with the weather application in real time. For example, weather information may change from sunny and/or clear as shown in screen (a) of FIG. 12 to rainy as shown in screen (c) of FIG. 12.

Further, in a case of weather emergencies or weather watch warnings (e.g., heavy rain warning, heat wave warning, and the like), the apparatus 100 may provide a separate identifier indicating the weather emergency or weather watch warning on at least a portion of the icon associated with the weather application.

When there is a difference in sensory temperature by a specific degree or higher, for example, five degrees or higher when compared to that of the previous day, the apparatus 100 may display a separate identifier for indicating this fact on at least a portion of the icon associated with the weather application. Also, the apparatus 100 may display life-friendly weather information (e.g., good weather to do exercise, good weather for observing the stars, and the like) on at least a portion of the icon associated with the weather application using a separate identifier.

Figure 13:
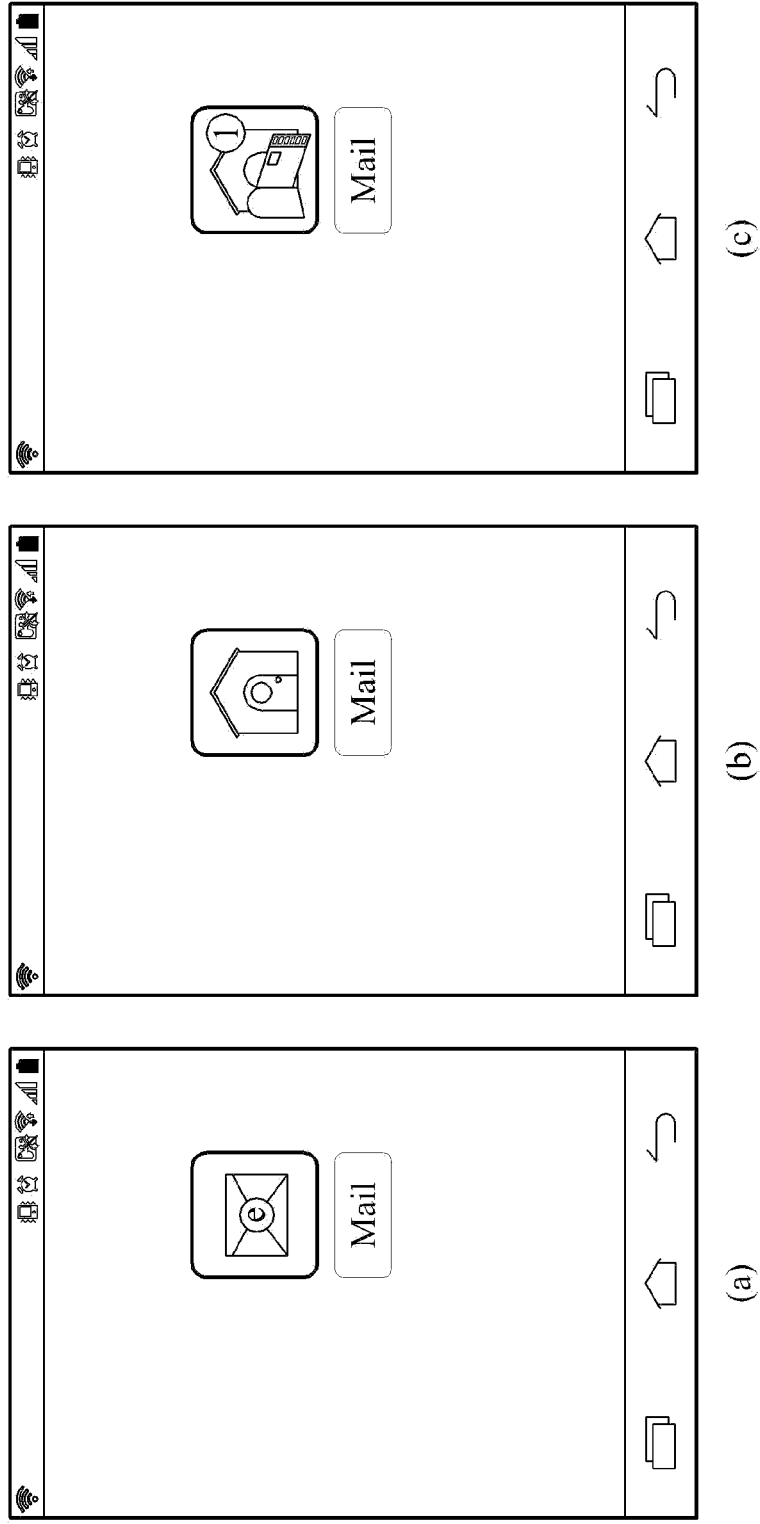
FIG. 13 is a diagram illustrating controlling display of a terminal icon associated with an electronic mail application according to an exemplary embodiment of the present invention.

FIG. 13 is a diagram illustrating controlling display of a terminal icon associated with an electronic mail application according to an exemplary embodiment of the present invention.

When data associated with the electronic mail application is updated, the apparatus 100 may display information associated with the updated data on at least a portion of the icon associated with the electronic mail application.

In screen (a) of FIG. 13, an existing screen of the terminal displaying the icon associated with the electronic mail application is shown. Referring to screen (b) and screen (c) of FIG. 13, when data associated with the electronic mail application is updated, the apparatus 100 may display the second graphical object for the updated data on at least a portion of the icon associated with the electronic mail application when the updated data satisfies the graphical object change condition.

Referring to screen (b) and screen (c) of FIG. 13, when a new mail arrives in the electronic mail application, the apparatus 100 may display a number of new mails on at least a portion of the icon associated with the electronic mail application. Also, the icon may be provided with a motion, and a number of unread mails may be displayed.

According to aspects of the invention, as number of unopened mails increases, the motion of the icon may be displayed as various images. When the unopened mail is opened, the icon of the electronic mail application may be changed to an icon of a basic image. A maximum number of unopened mails displayable on the icon may be 999, and when a number of unopened mails exceeds the maximum number, ' . . . ' may be displayed. However, aspects of the invention are not limited thereto, such that maximum number of unopened mails may be displayed in a different format.

Figure 14:
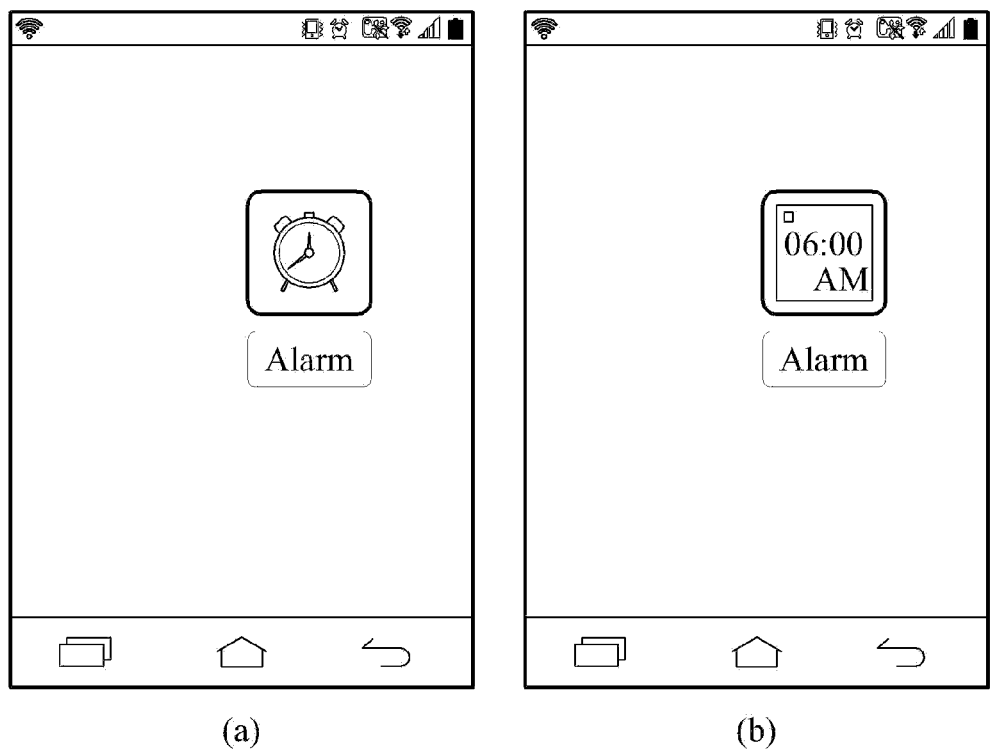
FIG. 14 is a diagram illustrating controlling display of a terminal icon associated with an alarm application according to an exemplary embodiment of the present invention.

FIG. 14 is a diagram illustrating controlling display of a terminal icon associated with an alarm application according to an exemplary embodiment of the present invention.

When data associated with an alarm application is updated, the apparatus 100 may display information associated with the updated data on at least a portion of the icon associated with the alarm application.

In screen (a) of FIG. 14, an existing screen of the terminal displaying the icon associated with the alarm application is shown. Referring to screen (b) of FIG. 14, when data associated with the alarm application is updated (e.g., an alarm is set by the user), the apparatus 100 may classify information associated with the updated data based on the graphical object change condition and display the updated data on at least a portion of the icon associated with the alarm application.

The apparatus 100 may display the icon associated with the alarm application on a home screen of the terminal. When multiple alarms are set, the apparatus 100 may display an alarm time nearest to the present time. Also, when a plurality of alarms are set, the apparatus 100 may be configured to preferentially display an alarm coming soon on at least a portion of the icon associated with the alarm application or preferentially display a particular number of alarms or more on at least a portion of the icon associated with the alarm application according to a user selection.

Further, the apparatus 100 may display a number of alarms set in the terminal on at least a portion of the icon associated with the alarm application. Also, the apparatus 100 may display a countdown before a particular time at which the alarm is set to sound.

According to aspects of the invention, when the alarm is set, the apparatus 100 may display at least one of an alarm time, alarm information, and the like, more brightly on at least a portion of the icon associated with the alarm application. Further, when an alarm is not set or unset, different visual effects may be applied by performing a dimming operation.

Figure 15:
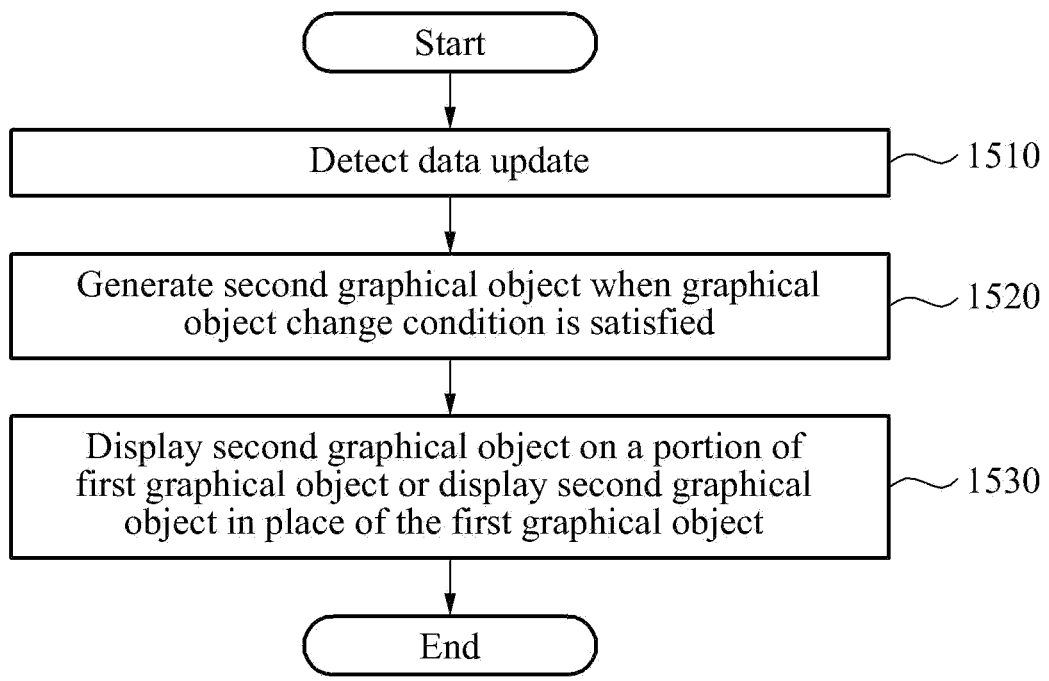
FIG. 15 is a flowchart illustrating a method for controlling a terminal icon according to an exemplary embodiment of the present invention.

FIG. 15 is a flowchart illustrating a method for controlling a terminal icon according to an exemplary embodiment of the present invention.

The detection unit 110 of the apparatus 100 may detect an update of data associated with the terminal in operation 1510. Further, the update of data may be detected in real time. However, aspects of the invention are not limited thereto, such that the update of data may be detected at a scheduled or reference time intervals. The data associated with the terminal may include, without limitation, a content stored or generated in the terminal as described in the foregoing.

When the update of the data is detected by the detection unit 110 of FIG. 1, the processing unit 120 of FIG. 1 may generate a second graphical object associated with the updated data when the updated data satisfies the graphical object change condition in operation 1520.

The control unit 130 of FIG. 1 may display the second graphical object for the updated data on at least a portion of the first graphical object, or may display the second graphical object in place of the first graphical object in operation 1530.

The units and apparatuses described herein may be implemented using hardware components. The hardware components may include, for example, various controllers, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. Although the description of a processing device is used as singular, aspects of the invention are not limited thereto, such that a processing device may include multiple processing elements and multiple types of processing elements. For example, a hardware component may include multiple processors or a processor and a controller. In addition, different processing configurations are possible, such a parallel processors.

The software may include, for example, a computer program, a piece of code, an instruction, or some combination thereof for independently or collectively instructing or configuring the processing device to operate as desired. Software and data may be embodied permanently or temporarily in one or more types of machines, components, physical or virtual equipment, computer storage medium or device capable of providing instructions or data to or being interpreted by the processing device. The software also may be distributed over network coupled computer systems so that the software is stored and executed in a distributed fashion. For example, the software and data may be stored by one or more computer readable recording mediums.

The methods according to the exemplary embodiments may be recorded in computer-readable media including program instructions to implement various operations embodied by a computer. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media, such as a compact disc read-only memory (CD ROM) disks and a digital versatile disc (DVD); magneto-optical media, such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for controlling display of an icon on a terminal, comprising:
   displaying a first graphical object corresponding to the icon for accessing a corresponding application;
   detecting a first data update and a second data update for the application;
   generating a second graphical object based on the first data update;
   generating a third graphical object based on the second data update; and
   displaying, simultaneously or sequentially, the second graphical object and the third graphical object on at least a portion of the first graphical object or in place of the first graphical object,
   wherein the second graphical object corresponds to a content of the first data update and the third graphical object corresponds to a content of the second data update.

2. The method of claim 1, wherein the second graphical object is generated if a graphical object condition is satisfied.

3. The method of claim 2, wherein the graphical object condition is based on a log stored in the terminal.

4. The method of claim 3, wherein the log stores at least one of an activity history of the terminal, interaction with a contact, and social network activity information.

5. The method of claim 1, wherein the second graphical object comprises an image corresponding to the content.

6. The method of claim 1, wherein the second graphical object comprises a function key for operating a portion of the content.

7. The method of claim 1, wherein the second graphical object comprises a different color than the first graphical object.

8. The method of claim 1, wherein the second graphical object comprises at least one profile image of a contact.

9. The method of claim 8, wherein the second graphical object further comprises a numerical indicator corresponding to the first data update and linked to the at least one profile image.

10. The method of claim 1, wherein the second graphical object comprises at least a clip of the content.

11. The method of claim 1, wherein the second graphical object comprises an album cover art corresponding to the content.

12. The method of claim 1, wherein the second graphical object comprises a signal strength of a source station.

13. The method of claim 1, wherein the second graphical object comprises weather information.

14. The method of claim 1, wherein the second graphical object comprises alarm settings.

15. The method of claim 1, wherein the first data update is detected in real time.

16. The method of claim 1, wherein the first graphical object is a default icon image corresponding to the application.

17. An apparatus to control display of an icon, comprising:
   a memory configured to store a first graphical object corresponding to the icon for accessing a corresponding application; and
   a processor configured with processor-executable instructions to perform operations comprising:
      detecting a first data update and a second data update for the application;
      generating a second graphical object based on the first data update and generate a third graphical object based on the second data update; and
      controlling display, simultaneously or sequentially, of the second graphical object and the third graphical object on at least a portion of the first graphical object or in place of the first graphical object,
   wherein the second graphical object corresponds to a content of the first data update and the third graphical object corresponds to a content of the second data update.

* * * * *